United States Patent
Shibutani et al.

(10) Patent No.: US 7,161,153 B2
(45) Date of Patent: Jan. 9, 2007

(54) APPARATUS AND METHOD FOR DETECTING α-RAY

(75) Inventors: Toru Shibutani, Hitachi (JP); Akihisa Kaihara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 224 days.

(21) Appl. No.: 10/810,802

(22) Filed: Mar. 29, 2004

(65) Prior Publication Data
US 2004/0200968 A1    Oct. 14, 2004

(30) Foreign Application Priority Data
Mar. 31, 2003  (JP)  ............................. 2003-093713

(51) Int. Cl.
G01T 1/17 (2006.01)
G01T 1/24 (2006.01)

(52) U.S. Cl. ............................................. 250/370.02

(58) Field of Classification Search ........... 250/370.02, 250/307; 324/71.4
See application file for complete search history.

(56) References Cited

U.S. PATENT DOCUMENTS

| | | | | |
|---|---|---|---|---|
| 3,678,275 A | * | 7/1972 | Schneider et al. | ........... 250/374 |
| 4,450,354 A | * | 5/1984 | Smith et al. | ................ 250/256 |
| 4,585,939 A | * | 4/1986 | Arnold et al. | ............... 250/256 |
| 5,231,290 A | * | 7/1993 | Czirr et al. | ............. 250/390.11 |
| 6,639,392 B1 | | 10/2003 | Kogawa et al. | |
| 2002/0084420 A1 | * | 7/2002 | Kitaguchi et al. | ..... 250/370.01 |
| 2003/0030444 A1 | * | 2/2003 | Kogawa et al. | ............. 324/464 |

FOREIGN PATENT DOCUMENTS

| | | |
|---|---|---|
| JP | 10-213666 | 8/1998 |
| JP | 2003-50279 | 2/2003 |

OTHER PUBLICATIONS

"Radiation Handling Techniques," edited by Japan Atomic Industrial Forum, May 26, 1998, pp. 224-225.

* cited by examiner

*Primary Examiner*—Otilia Gabor
(74) *Attorney, Agent, or Firm*—Dickstein Shapiro LLP

(57) ABSTRACT

An α-ray measuring apparatus is provided for accurately analyzing the energy of a trace of α-rays emitted from a sample in a short time using semiconductor detectors which excel in energy resolution. The α-ray measuring apparatus comprises an α-ray detector including a plurality of semiconductor detectors, an adder for adding output signals from the respective semiconductor detectors, an anticoincidence counter for anticoincidently counting the output signals from the respective semiconductor detectors, and a peak analyzer for analyzing an energy distribution of the α-rays based on an addition of the output signals from the semiconductor detectors which are not anticoincidently counted. Since the output signals from the plurality of semiconductor detectors are added to increase the area of a sample under measurement and also remove background noise, the α-ray measuring apparatus can more accurately analyze the energy of the α-rays while reducing a measuring time.

10 Claims, 6 Drawing Sheets

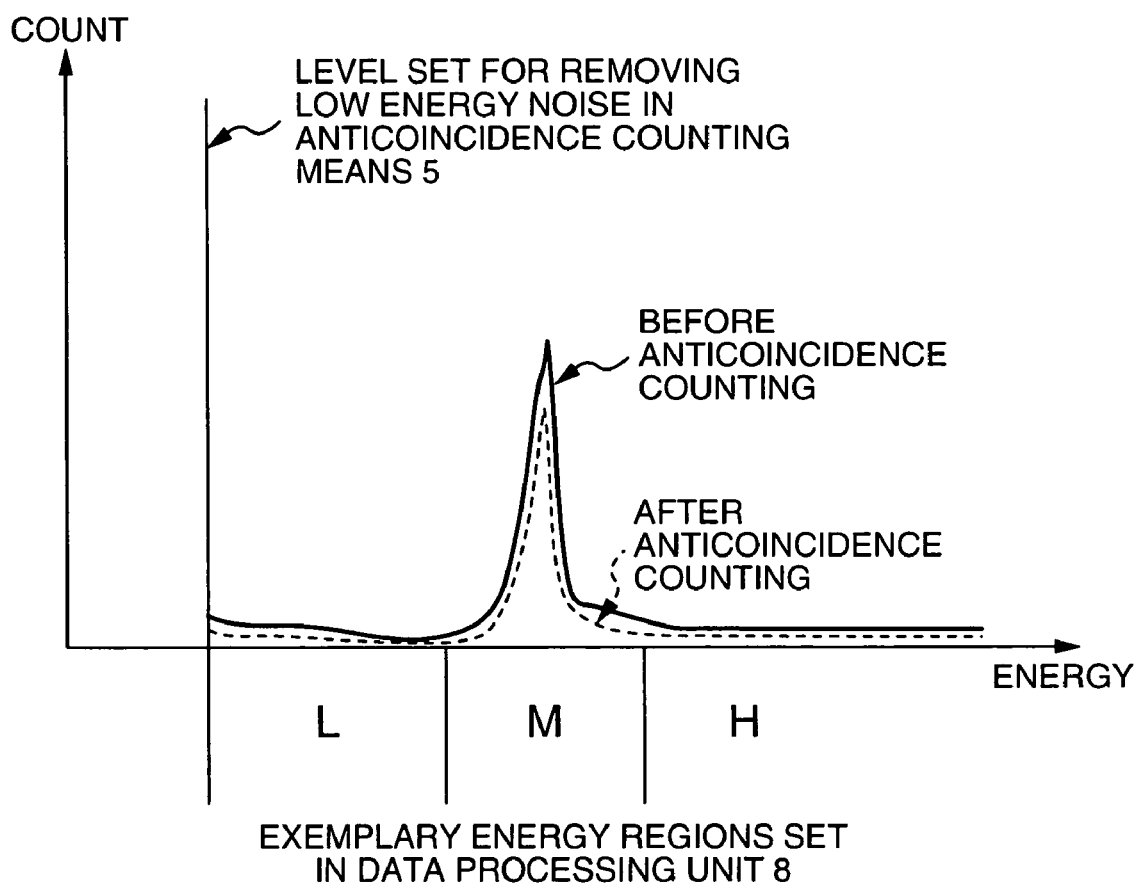

APPARATUS AND METHOD FOR DETECTING α-RAY

BACKGROUND OF THE INVENTION

The present invention relates to an apparatus and method for detecting α-rays using a semiconductor detector made of silicon or the like, particularly suitable for reducing a time required for measuring the α-rays.

A PR gas-based gasflow counter has been known as a device for measuring a trace of α-rays contained in a sample. This type of counter tube is described, for example, in "Radiation Handling Techniques", Japan Atomic Industrial Forum, edited by Japan Atomic Industrial Forum, pp. 224–225, May 26, 1998.

A semiconductor-based detector using a semiconductor detector has been also known as an α-ray measuring apparatus which is capable of analyzing energy. This type of detector is described, for example, in JP-A-10-213666, particularly on page 2 and in FIG. 1.

The gasflow counter is suitable for capturing α-rays in measurements of a trace of α-rays emitted from a sample because it is readily provided with a larger area for the capture. However, this type of counter tube exhibits a low dependency on the energy of the α-rays emitted from the sample, and a low energy resolution.

The solid state (semiconductor) detector, on the other hand, exhibits a high energy resolution. Disadvantageously, however, the semiconductor detector has a small sensitive area, with difficulties in increasing the sensitive area, and therefore takes a long measurement time for accurately measuring a trace of α-rays.

Also, for accurately measuring the α-ray in a short time, it is necessary to sufficiently remove background noise due to cosmic radiations and electric disturbance. A sufficiently thick shielding material must be provided for removing the background noise to a predetermined level, resulting in a cumbersome and heavy α-ray measuring apparatus as a whole.

SUMMARY OF THE INVENTION

It is an object of the present invention to provide an apparatus and method for measuring α-rays, which uses a semiconductor detector that excels in energy resolution to accurately analyze the energy of a trace of α-rays emitted from a sample in a short time.

To achieve the above object, the present invention provides an α-ray measuring apparatus which detects α-rays using a plurality of semiconductor detectors, adds output signals from the respective semiconductor detectors, and analyzes an energy distribution of the α-rays based on an addition of the output signals from the semiconductor detectors.

A plurality of semiconductor detectors are used for detecting α-rays, and the output signals from the respective semiconductor detectors are added, the α-ray measuring apparatus of the present invention can substantially increase the area of a sample under measurement and reduce a measuring time.

More specifically, the present invention provides an α-ray measuring apparatus which detects α-rays using a plurality of semiconductor detectors arranged on a plane surface, adds output signals from the respective semiconductor detectors, anticoincidently counts the outputs from the respective semiconductor detectors, and analyzes an energy distribution of the α-rays based on an addition of the output signals from the semiconductor detectors which are not anticoincidently counted.

In addition, the present invention provides an α-ray measuring apparatus which detects α-rays using a plurality of semiconductor detectors arranged one above another, adds output signals from the respective semiconductor detectors, anticoincidently counts the output signals from the respective semiconductor detectors, and analyzes an energy distribution of the α-rays based on an addition of the output signals from the respective semiconductor detectors which are not anticoincidently counted.

Further, the present invention provides an α-ray measuring apparatus which detects α-rays using a plurality of semiconductor detectors arranged on plane surfaces placed one above another, adds output signals from the respective semiconductor detectors on each of the plane surfaces, anticoincidently counts the output signals from the respective semiconductor detectors on the respective plane surfaces, and analyzes an energy distribution of the α-rays based on an addition of the output signals, which are not anticoincidently counted, from the semiconductor detectors on each of the plane surfaces.

In any of the α-ray measuring apparatuses described above, the anticoincidence counting can be made between the output signal from at least one of the semiconductor detectors and the output signals from the remainder of the semiconductor detectors.

These α-ray measuring apparatuses which comprise the anticoincidence counting means can remove cosmic radiations and electric disturbance which can cause background noise.

The α-ray measuring apparatus may further comprise data processing means for specifying an energy range to be evaluated and for displaying the result of analysis after analyzing a peak value.

The α-ray measuring apparatus of the present invention can more accurately analyze the energy of α-rays while reducing a measuring time because the output signals from a plurality of semiconductor detectors are added to increase the area of a sample under measurement and to remove background noise.

Other objects, features and advantages of the invention will become apparent from the following description of the embodiments of the invention taken in conjunction with the accompanying drawings.

BRIEF DESCRIPTION OF THE DRAWINGS

FIG. 6 is a graph showing an exemplary energy measurement range which is set in the α-ray measuring apparatus, and a background noise reducing effect.

DETAILED DESCRIPTION OF THE EMBODIMENTS

Now, several embodiments of an α-ray measuring apparatus according to the present invention will be described with reference to FIGS. 1 to 6.

[First Embodiment]

Figure 1:
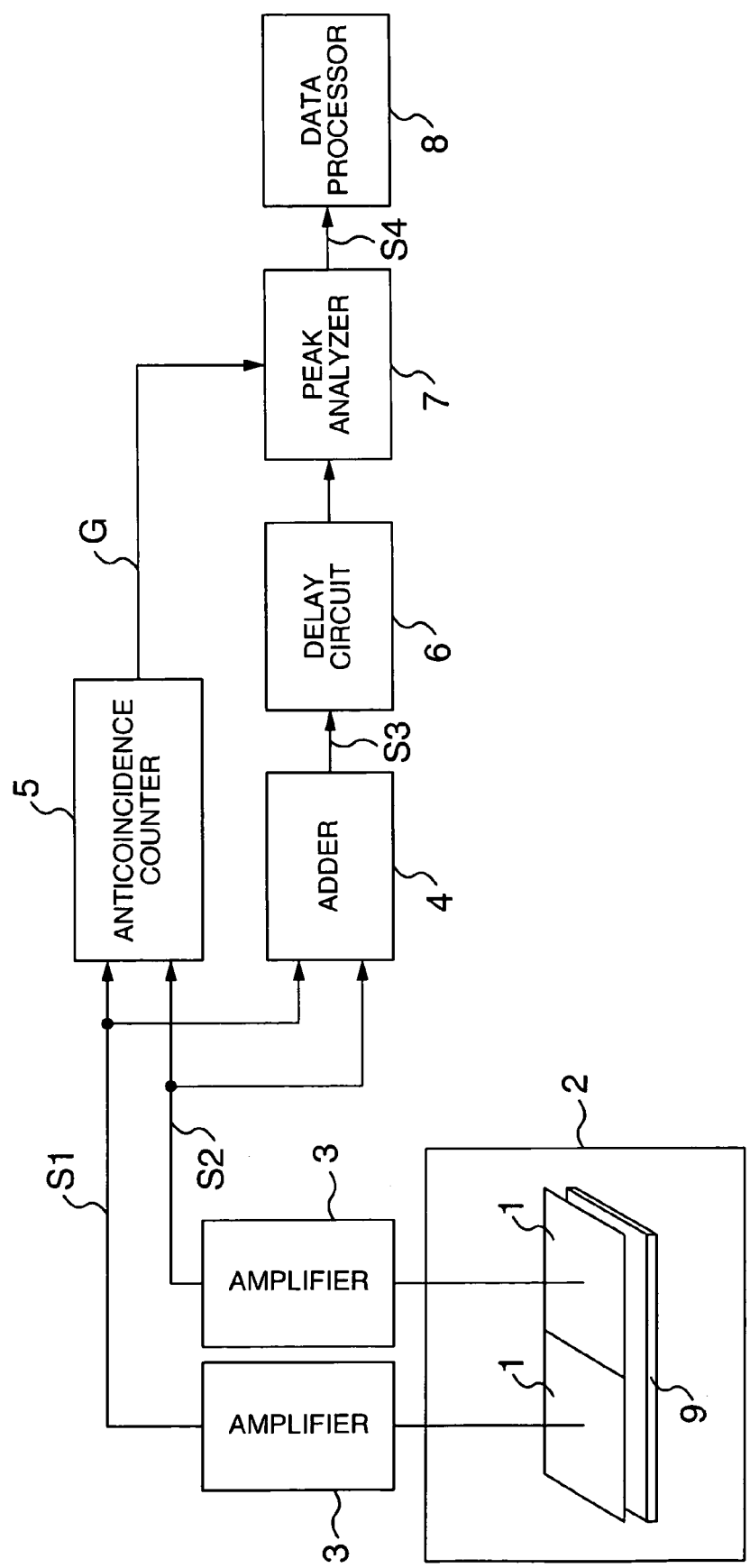
FIG. 1 is a block diagram illustrating the systematic configuration of an α-ray measuring apparatus according to a first embodiment of the present invention, which has a plurality of semiconductor detectors arranged on a plane surface.

FIG. 1 is a block diagram illustrating the systematic configuration of a first embodiment of an α-ray measuring apparatus according to the present invention, which has a plurality of semiconductor detectors arranged on a plane surface.

The α-ray measuring apparatus according to the first embodiment, which is configured to measure α-rays from a sample under measurement 9, comprises an α-ray detecting means 2, amplifying means (amplifiers. The same applies to the following) 3, an adding means 4 (adder. The same applies to the following), a anticoincidence counting means 5 (anticoincidence counter. The same applies to the following), a delay circuit 6, a peak analyzing means (peak analyzer. The same applies to the following) 7, and a data processing means (data processor. The same applies to the following) 8.

The α-ray detecting means 2 includes a plurality of semiconductor detectors 1 arranged in close proximity to one another on a plane surface. Signals from the semiconductor detectors 1 are amplified by the respective amplifying means 3 associated therewith to generate two signals S1, S2.

These signals S1, S2 are inputted to the adding means 4 for adding the two signals, and to the anticoincidence counting means 5 for determining as disturbance when the signals S1, S2 are generated simultaneously.

The signals S1, S2 from the semiconductor detectors 1 are added by the adding means 4 to generate an addition output signal S3. The addition of the signals S1, S2 from a plurality of semiconductor detectors 1 allows for a measurement of α-rays over a sample area twice as wide as when a single semiconductor detector 1 is used for the measurement.

The addition output signal S3 is inputted to the peak analyzing means 7 as a measured signal through the delay circuit 6 for adjusting an arrival time with a gate signal G.

For analyzing the energy of α-rays, a relatively high energy region is evaluated. However, when a trace of α-rays is emitted from the sample under measurement 9 in the high energy region, α-rays are counted only several times for an hour, so that the α-rays emitted from the sample under measurement 9 simultaneously impinge on the two semiconductor detectors 1 with an extremely low probability.

On the other hand, cosmic radiations and electric disturbance tend to cause the two semiconductor detectors 1 to simultaneously generate false signals which should be regarded as noise. Bearing this in mind, the anticoincidence counting means 5 determines signals as noise when they are simultaneously measured by the two semiconductor detectors 1.

For reference, a gasflow counter has a low dependency on the energy of α-rays emitted from a sample, and exhibits a low energy resolution, as mentioned above, but provides a high count value because it counts whatever rays irrespective of the energy, and is less affected by background noise due to the cosmic radiations and the like, as compared with a semiconductor detector which is capable of analyzing the energy.

When a relatively high energy region is analyzed by a measuring technique based on the semiconductor detectors, the analysis is affected more by background noise due to the cosmic radiations and the like because of a less number of counts, as mentioned above.

To accommodate this inconvenience, the α-ray measuring apparatus of the present invention comprises the anticoincidence counting means 5 for reducing an overall background counting ratio (BG counting ratio).

When the anticoincidence counting means 5 identifies noise, the gate signal G sent to the peak analyzing means 7 acts to close a gate, causing the peak analyzing means 7 to exclude from measured signals the signal S3 inputted thereto at that timing as a measured signal.

An output signal S4 from the peak analyzing means 7 is inputted to the data processing means 8. The data processing means 8 specifies an energy range to be evaluated, and displays the result of analysis.

Figure 2:
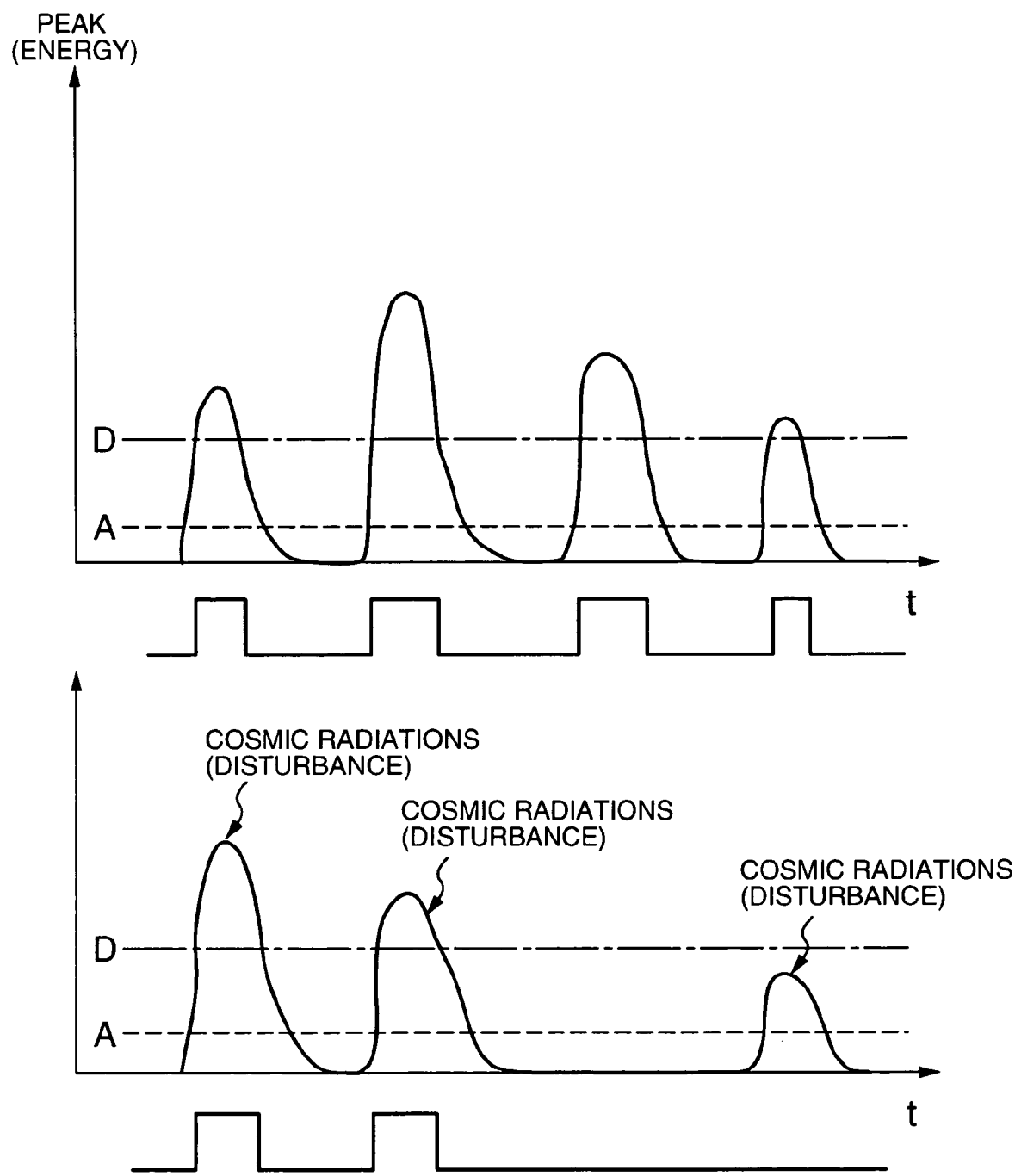
FIG. 2 shows graphs for explaining why different energy levels are set to a anticoincidence counting means and a data processing means, respectively, for identifying a peak value.

FIG. 2 shows graphs for explaining why different energy levels are set to the anticoincidence counting means 5 and data processing means 8 for identifying a peak value.

The background noise due to cosmic radiations and electric disturbance may have different energy as presented in the result of measurement even if it occurs simultaneously in two sensors.

If a predetermined energy level D in a discriminator or peak value identifier circuit, essentially used by the data processing means 8, is set in the anticoincidence measuring means 5, the α-ray measuring apparatus may sometimes fail to detect a disturbance signal as it should be, such as the third signal in the lower graph of FIG. 2 corresponding to the fourth disturbance in the upper graph of FIG. 2, so that this disturbance signal may not be regarded as those that should be removed.

To avoid this problem, a detection level A for disturbance signals is set in the anticoincidence counting means 5 at a noise removing level on the verge of lower limit energy under evaluation, such that disturbance signals equal to or higher than this level are all picked up by the counting means 5.

A specific example of energy range specified in the data processing means 8 will be described later with reference to FIG. 6.

An important value representative of the performance of the α-ray measuring apparatus is a lower limit value of measurement, i.e., a measurable lower limit D (C/cm²·h). The lower limit value of measurement is generally expressed by the following Equation (1):

$$D \approx 3\{\sqrt{(2nb/tb)}\}/(\Gamma \cdot A) \qquad (1)$$

where tb is a background GB measuring time (hours); nb is a BG counting ratio (C/h); Γ is a detection efficiency; and A is a sample area (cm²).

It can be understood from Equation (1) that the BG counting ratio must be reduced, while the area of the sample under measurement must be increased for making a more accurate measurement.

With the employment of the configuration in FIG. 1, even an increase in the sample area by a factor of two allows a measurement with a lower limit value of measurement half as high as that required for a single semiconductor detector 1.

Further, since the anticoincidence counting means 5 contributes to a reduction in background noise due to cosmic radiations and electric disturbance, the BG counting ratio can be more reduced to achieve a more accurate measurement.

Figure 3:
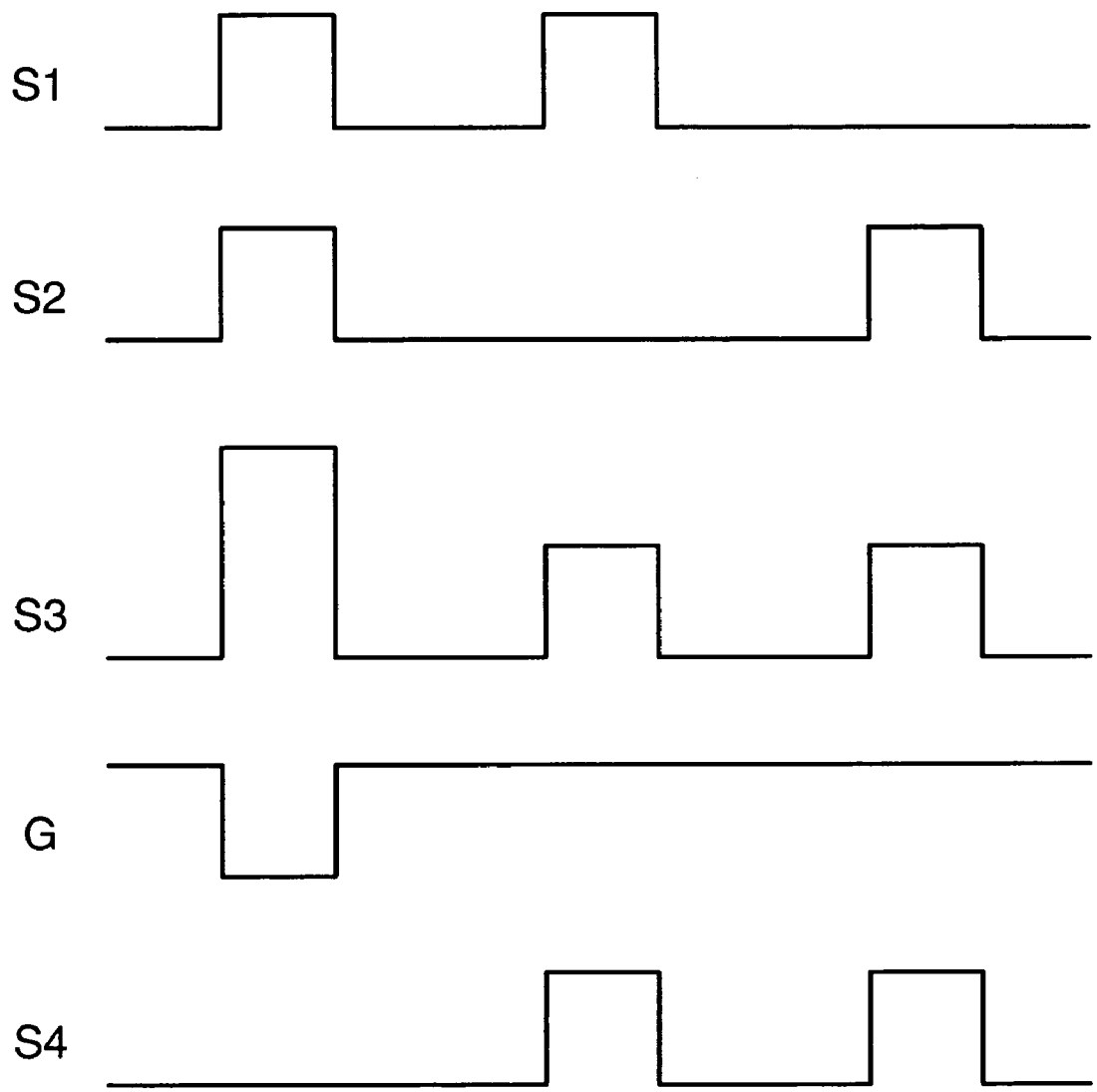
FIG. 3 shows waveform charts of signals associated with the α-ray measuring apparatus of the first embodiment for schematically showing the relationship among the signals.

FIG. 3 schematically shows the relationship among signals in the α-ray measuring apparatus according to the first embodiment.

Random signals S1, S2 measured by the two semiconductor detectors 1 are outputted therefrom, respectively, and added by the adding means 4 to generate a signal S3.

The anticoincidence counting means 5 outputs a gate signal G for turning ON/OFF a gate of the peak analyzing means 7. The gate signal G serves to turn OFF the gate only when S1 and S2 are measured simultaneously.

A signal S4 is outputted from the peak analyzing means 7 only when the signals S1 and S2 are not simultaneously generated, i.e., represents the output of the adding means 4 when the signals S1 and S2 are not anticoincidently counted, so that background noise can be reduced.

[Second Embodiment]

Figure 4:
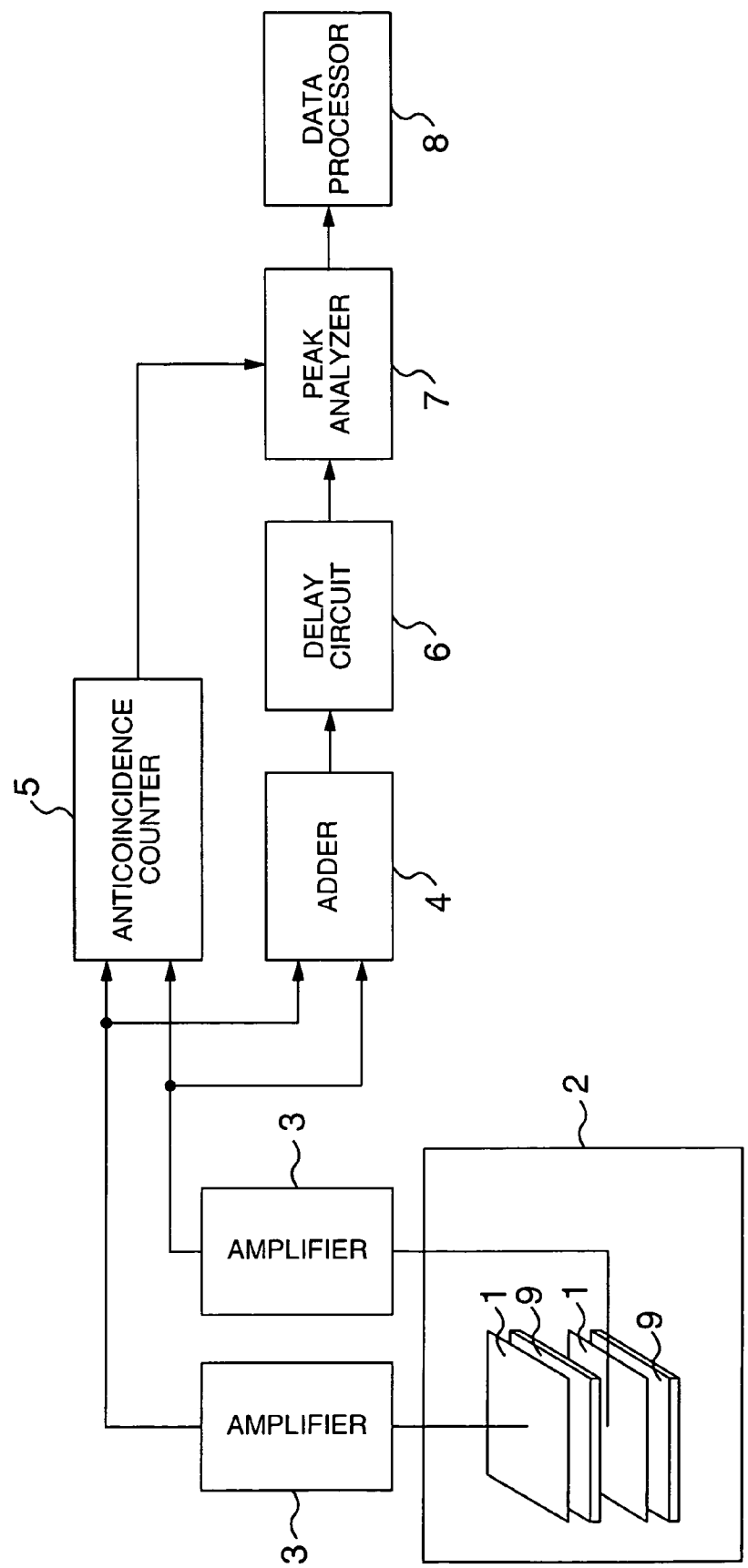
FIG. 4 is a block diagram illustrating the systematic configuration of an α-ray measuring apparatus according to a second embodiment, which has a plurality of semiconductor detectors arranged one above another.

FIG. 4 is a block diagram illustrating the systematic configuration of an α-ray measuring apparatus according to a second embodiment, which has a plurality of semiconductor detectors arranged one above another.

In the second embodiment where semiconductor detectors 1 are arranged one above the other, a sample under measurement 9 may be provided corresponding to each of the semiconductor detectors 1, or may be provided only for one of the upper and lower semiconductor detectors 1.

When the sample under measurement 9 is provided only for one semiconductor detector 1, the semiconductor detector 1 not provided with the sample under measurement 9 functions only for anticoincidence counting.

[Third Embodiment]

Figure 5:
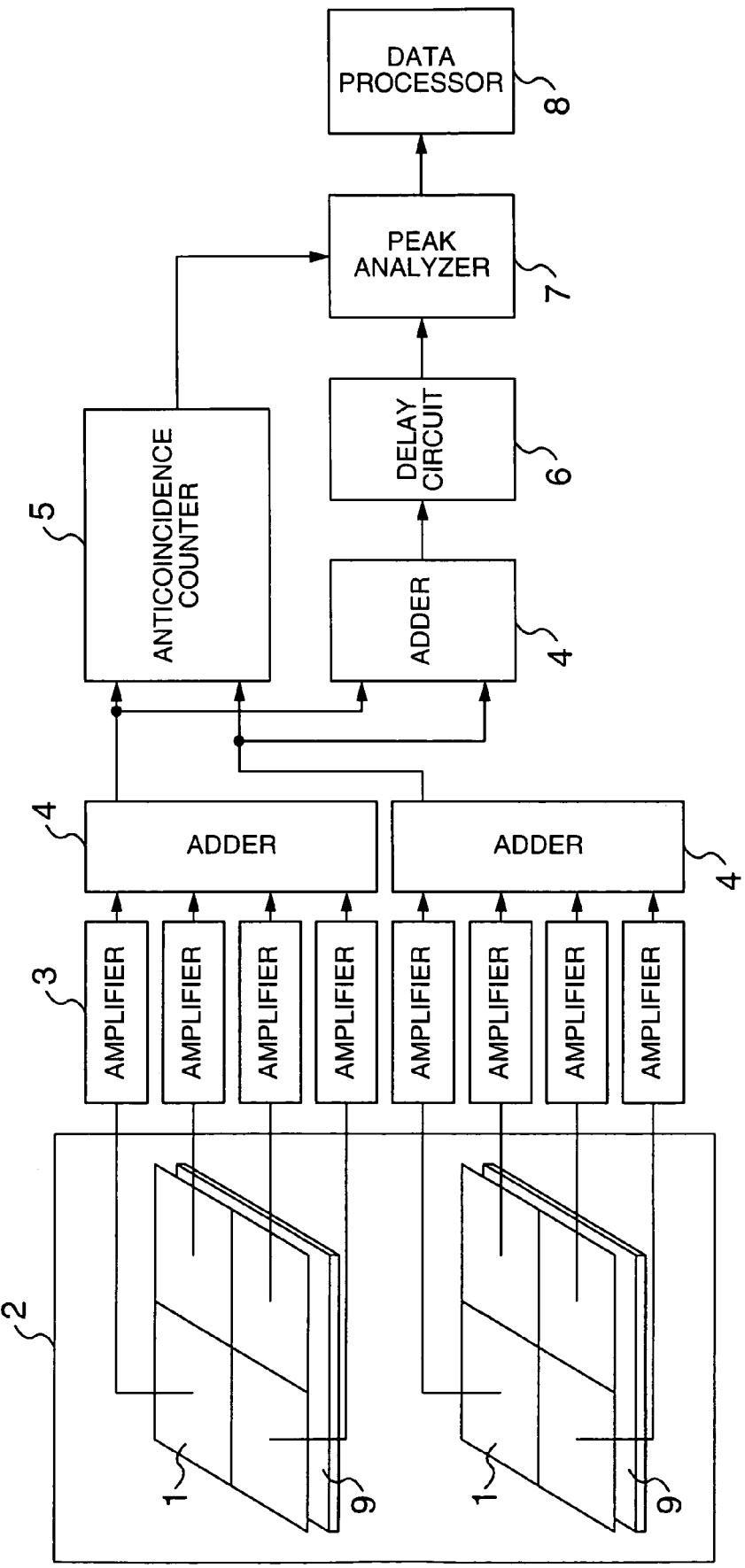
FIG. 5 is a block diagram illustrating the systematic configuration of an α-ray measuring apparatus according to a third embodiment of an α-ray measuring apparatus, which has a plurality of semiconductor detectors arranged on plane surfaces that are placed one above the other.

FIG. 5 is a block diagram illustrating the systematic configuration of an α-ray measuring apparatus according to a third embodiment of an α-ray measuring apparatus, which has a plurality of semiconductor detectors arranged on plane surfaces that are placed one above the other.

In the third embodiment, the α-ray measuring apparatus comprises the adding means 4 in FIG. 1, and an extra adding means 4 in front of the anticoincidence counting means 5 for adding signals from four semiconductor detectors 1. It should be noted that a plurality of semiconductor detectors 1 may be connected to a single amplifying means 3.

According to the third embodiment, the effective area of the α-ray measuring means 2 can be further increased.

[Fourth Embodiment]

In the α-ray measuring apparatus according to the third embodiment illustrated in FIG. 5, the anticoincidence counting is performed by the upper stage and lower stage.

In the present invention, a modification to the circuit configuration permits the anticoincidence counting to be carried out as well between the output of at least one semiconductor detector 1 and the output of the remaining semiconductor detector 1, so that there are no limitations to a combination of the semiconductor detectors 1 involved in the anticoincidence counting.

Other than the semiconductor detectors 1 for measuring α-rays emitted from a sample, an extra semiconductor detector 1 may be provided only for the anticoincidence counting.

FIG. 6 is a graph showing an exemplary energy measurement range which is set in the α-ray measuring apparatus, and a background noise reducing effect.

As previously described in connection with FIG. 2, when the detection level A is set in the anticoincidence counting means 5 for detecting for disturbance signals, noise below the level set for removing low energy noise is removed from signals subjected to the evaluation.

When an energy range is specified in the data processing means 8, a count belonging to an energy range L below a predetermined value, a count belonging to a predetermined range M, and a count belonging to an energy range H equal to or higher than the predetermined value, for example, can be provided for display on a screen.

The ranges can be flexibly specified independently of the detection level A set for disturbance signals in the anticoincidence counting means 5, making it possible to remove cosmic radiations and electric disturbance and accurately measure α-rays emitted from the sample under measurement 9 in a shorter time.

As described above, the α-ray measuring apparatus of the present invention can increase the area of a sample under measurement and also remove background noise by adding output signals from a plurality of semiconductor detectors to reduce a time required for a measurement and more accurately analyze the energy of α-rays.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An α-ray measuring apparatus comprising:
    an α-ray detector including a plurality of semiconductor detectors;
    an adder for adding output signals from said respective semiconductor detectors;
    an anticoincidence counter for taking a logical product of a plurality of semiconductor detectors, wherein the anticoincidence counter delays a signal created from the logical product to create a gate signal;
    a signal corresponding to the gate signal is suppressed from an addition signal obtained by adding outputs from the plurality of semiconductor detectors; and
    a peak analyzer for analyzing an energy distribution of α-rays based on a signal obtained after suppression of the signal corresponding to the gate signal from the addition signal obtained by adding the outputs from the plurality of semiconductor detectors.

2. An α-ray measuring apparatus according to claim 1, wherein: said anticoincidence counter anticoincidently counts between an output signal of at least one of said semiconductor detectors and output signals of the remainder of said semiconductor detectors.

3. An α-ray measuring apparatus according to claim 1, further comprising a data processor for specifying an energy range to be evaluated, and for displaying the result of analysis.

4. An α-ray measuring apparatus comprising:
    an α-ray detector including a plurality of semiconductor detectors arranged on a plane surface;
    an adder for adding output signals from said respective semiconductor detectors to generate an addition output signal;

an anticoincidence counter for anticoincidently counting the output signals from said respective semiconductor detectors, wherein the anticoincidence counter takes a logical product of a plurality of semiconductor detectors and delays a signal created from the logical product to create a gate signal;

a signal corresponding to the gate signal is suppressed from an addition signal obtained by adding outputs from the plurality of semiconductor detectors; and a peak analyzer for analyzing an energy distribution of α-rays based on a signal obtained after suppression of the signal corresponding to the gate signal from the addition signal obtained by adding the outputs from the plurality of semiconductor detectors which are not anticoincidently counted.

5. An α-ray measuring apparatus comprising:

an α-ray detector including a plurality of semiconductor detectors arranged one above another;

an adder for adding output signals from said respective semiconductor detectors to generate an addition output signal;

an anticoincidence counter for anticoincidently counting the output signals of said respective semiconductor detectors, wherein the anticoincidence counter takes a logical product of a plurality of semiconductor detectors and delays a signal created from the logical product to create a gate signal;

a signal corresponding to the gate signal is suppressed from an addition signal obtained by adding outputs from the plurality of semiconductor detectors; and a peak analyzer for analyzing an energy distribution of α-rays based on a signal obtained after suppression of the signal corresponding to the gate signal from the addition signal obtained by adding the outputs of said respective semiconductor detectors which are not anticoincidently counted.

6. An α-ray measuring apparatus comprising:

an α-ray detector including a plurality of semiconductor detectors arranged on plane surfaces placed one above another;

an adder associated with each plane surface for adding output signals from said respective semiconductor detectors on said associated plane surface to generate an addition output signal;

an anticoincidence counter for anticoincidently counting the addition output signals of said respective sensors on said respective plane surfaces, wherein the anticoincidence counter takes a logical product of a plurality of semiconductor detectors and delays a signal created from the logical product to create a gate signal;

a signal corresponding to the gate signal is suppressed from an addition signal obtained by adding outputs from the plurality of semiconductor detectors; and a peak analyzer for analyzing an energy distribution of α-rays based on a signal obtained after suppression of the signal corresponding to the gate signal from the addition signal obtained by adding the outputs of said respective semiconductor detectors on said respective plane surfaces which are not anticoincidently counted.

7. An α-ray measuring method comprising the steps of:

detecting α-rays using a plurality of semiconductor detectors;

taking a logical product of a plurality of said semiconductor detectors using an anticoincidence counter;

delaying a signal created from the logical product using said anticoincidence counter to create a gate signal;

suppressing a signal corresponding to the gate signal from a signal obtained by adding output signals from said respective semiconductor detectors; and analyzing an energy distribution of the α-rays based on an addition of the output signals from said semiconductor detectors.

8. An α-ray measuring method comprising the steps of:

detecting α-rays using a plurality of semiconductor detectors arranged on a plane surface;

taking a logical product of a plurality of said semiconductor detectors using an anticoincidence counter;

delaying a signal created from the logical product using said anticoincidence counter to create a gate signal;

suppressing a signal corresponding to the gate signal from a signal obtained by adding output signals from said respective semiconductor detectors;

anticoincidently counting the output signals from said respective semiconductor detectors; and analyzing an energy distribution of the α-rays based on an addition of the output signals from said semiconductor detectors which are not anticoincidently countered.

9. An α-ray measuring method comprising the steps of:

detecting α-rays using a plurality of semiconductor detectors arranged one above another;

taking a logical product of a plurality of said semiconductor detectors using an anticoincidence counter;

delaying a signal created from the logical product using said anticoincidence counter to create a gate signal;

suppressing a signal corresponding to the gate signal from a signal obtained by adding output signals from said respective semiconductor detectors;

anticoincidently counting the output signals of said respective semiconductor detectors; and analyzing an energy distribution of the α-rays based on an addition of the output signals from said semiconductor detectors which are not anticoincidently countered.

10. An α-ray measuring method comprising the steps of:

detecting α-rays using a plurality of semiconductor detectors arranged on plane surfaces placed one above another;

taking a logical product of a plurality of said semiconductor detectors using an anticoincidence counter;

delaying a signal created from the logical product using said anticoincidence counter to create a gate signal;

suppressing a signal corresponding to the gate signal from a signal obtained by adding output signals from said respective semiconductor detectors on each of said plane surfaces;

anticoincidently counting the output signals from said respective semiconductor detectors on said respective plane surfaces; and analyzing an energy distribution of the α-rays based on an addition of the output signals from said semiconductor detectors on each of said plane surface which are not anticoincidently countered.

* * * * *